US 7,849,215 B2

(12) United States Patent
Csaszar et al.

(10) Patent No.: US 7,849,215 B2
(45) Date of Patent: Dec. 7, 2010

(54) UPDATING STATE IN EDGE ROUTERS

(75) Inventors: Andras Csaszar, Budapest (HU); Attila Takacs, Budapest (HU); Attila Bader, Páty (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 242 days.

(21) Appl. No.: 12/295,219

(22) PCT Filed: Mar. 31, 2006

(86) PCT No.: PCT/IB2006/050990

§ 371 (c)(1),
(2), (4) Date: Sep. 29, 2008

(87) PCT Pub. No.: WO2007/113621

PCT Pub. Date: Oct. 11, 2007

(65) Prior Publication Data

US 2009/0049194 A1 Feb. 19, 2009

(51) Int. Cl.
*G06F 15/173* (2006.01)
(52) U.S. Cl. .................. 709/242; 709/239; 709/243; 709/244; 370/229; 370/235; 370/351
(58) Field of Classification Search ................ 709/238; 370/229, 235, 351
See application file for complete search history.

(56) References Cited

U.S. PATENT DOCUMENTS

| 6,728,779 | B1 * | 4/2004 | Griffin et al. ............. 709/239 |
| 6,985,959 | B1 * | 1/2006 | Lee ........................... 709/238 |
| 7,046,680 | B1 * | 5/2006 | McDysan et al. ........... 370/396 |
| 7,376,087 | B2 * | 5/2008 | Srikrishna ................... 370/238 |
| 7,461,163 | B2 * | 12/2008 | Kryskow et al. ............ 709/235 |
| 7,647,425 | B2 * | 1/2010 | Charzinski et al. ......... 709/239 |
| 2001/0025310 | A1 | 9/2001 | Krishnamurthy et al. |
| 2001/0027490 | A1 * | 10/2001 | Fodor et al. ................. 709/238 |

(Continued)

FOREIGN PATENT DOCUMENTS

| EP | 1589696 A1 | 10/2005 |
| EP | 1715633 A1 | 10/2006 |
| WO | 02/01796 A2 | 1/2002 |
| WO | 02/11461 A2 | 2/2002 |

(Continued)

OTHER PUBLICATIONS

R. Braden et al., Integrated Services in the Internet Architecture: an Overview, Network Working Group, RFC 1633, Jun. 1994.

(Continued)

*Primary Examiner*—Michael Won

(57) ABSTRACT

Methods, edge routers and an edge-router-refresh network signalling message used to update state information in edge routers. A data session is established on a path from a source towards a destination connected from the source via a plurality of Autonomous Systems (AS). The edge-router-refresh network signalling message is created by an edge router acting an an ingress edge router. The edge-router-refresh network signalling message comprises an identifier of the data session, an identifier of the edge router, which issued the edge-router-refresh message and an indication that the edge-router-refresh message is meant to be used by the edge routers present on the modified path. Optionally, the edge-router-refresh network signalling message further comprises a list of the plurality of AS traversed by the path before the modification.

32 Claims, 6 Drawing Sheets

U.S. PATENT DOCUMENTS

| | | | |
|---|---|---|---|
| 2002/0156914 A1* | 10/2002 | Lo et al. | 709/238 |
| 2005/0086363 A1* | 4/2005 | Ji | 709/235 |
| 2005/0097219 A1* | 5/2005 | Goguen et al. | 709/238 |
| 2006/0155872 A1* | 7/2006 | Charzinski et al. | 709/238 |
| 2007/0156919 A1* | 7/2007 | Potti et al. | 709/238 |

FOREIGN PATENT DOCUMENTS

| | | |
|---|---|---|
| WO | 03/003139 A2 | 1/2003 |
| WO | WO 2005/076548 A | 8/2005 |

OTHER PUBLICATIONS

R. Braden et al., Resource ReSerVation Protocol (RSVP), Network Working Group, RFC 2205, Sep. 1997.

J. Wroclawski, The Use of RSVP with IETF Integrated Services, Network Working Group, RFC 2210, Sep. 1997.

S. Blake et al., An Architecture for Differentiated Services, Network Working Group, RFC 2475, Dec. 1998.

F. Baker et al., Aggregation of RSVP for IPv4 and IPv6 Reservations, Network Working Group, RFC 3175, Sep. 2001.

M. Brunner, Requirements for Signaling Protocols, Network Working Group, RFC 3726, Apr. 2004.

A. Bader et al., RMD-QOSM—The Resource Management in Diffserv QOS Model, Feb. 14, 2006.

P. Ji et al., A Comparison of Hard-state and Soft-state Signaling Protocols, SIGCOMM'03, Aug. 25-29, 2003, Karlsruhe, Germany.

* cited by examiner

UPDATING STATE IN EDGE ROUTERS

TECHNICAL FIELD

The present invention relates to state information update and, more particularly, to state information update in edge routers associated to a reserved path.

BACKGROUND

In Internet Protocol (IP) networks, on-path resource management protocols have been investigated in recent years and are currently under standardization. Such protocols are responsible for delivering the resource needs of a newly arriving flow between edges of network domains or Autonomous Systems (AS) and to the interior nodes of the AS on a path to be taken by the flow. This is done to ensure that the interior nodes can make a local admission control decision related thereto. The flow is usually admitted into a given AS only if all interior nodes in the path have admitted it. The flow is admitted end-to-end if all intermediate AS made a positive admission decision. Except for pure measurement based admission control, the admission of the flow also means that the reservation of related resources in all interior nodes is made.

The Internet Engineering Task Force (IETF) standardization organization has specified the ReSerVation Protocol (RSVP) signalling protocol for making resource reservation in IP routers and to provide integrated services (IntServ) for real-time and non real-time traffic in the Internet (see also RFC2205, RFC1633 and RFC2210).

The RSVP protocol requires storing of per flow reservation states in each router along the path. The reservation states are soft states, which means that they have to be refreshed by periodic refresh messages. If a reserved state is not refreshed, the state and corresponding resources are removed after the time-out period. Reservations can also be removed by explicit tear down message. RSVP messages always follow the path. Consequently, RSVP is able to inter-work with standard routing protocols. If the traffic is re-routed, refresh messages are used to make new reservation on a new path.

Storing and maintaining per flow states in each router can be problematic in large networks. In such a case, the number of flows and, therefore, the number of reservation states is high. After recognizing the scalability problem of RSVP and IntServ, IETF specified RSVP aggregation method, which allows making reservations for aggregated flows (see RFC3175). The minimal requirement for aggregation is for aggregated flows to share common ingress and egress routers. Aggregated reservation states are created, modified or refreshed for the aggregated flow instead of each flow request.

To provide Quality of Service (QoS) in large-scale networks, another architecture, Differentiated Services (DiffServ), was proposed (see RFC2475). In the DiffServ architecture, scalability is achieved by offering different levels of QoS on an aggregation of flows (e.g. a series of class of service) rather than on a per-flow basis. For DiffServ to be efficient, per-flow states (e.g. flow to class of service assignments) have to be pushed to the edges of the network, leaving stateless intermediate routers (from a DiffServ perspective). The service differentiation is achieved by using the Differentiated Services (DS) field in the header of individual IP packets. Packets are classified into Per-Hop Behavior (PHB) groups at the DiffServ edge nodes. Each PHB has defined QoS characteristics determined at least between the ingress and egress routers. Packets are handled in DiffServ routers according to the PHB indicated by the DS field in the packet's header. The DiffServ architecture does not specify any way for devices outside the AS to dynamically reserve resources or to receive indications of network resource availability. In practice, service providers rely on subscription-time Service Level Agreements (SLA) that statically define the parameters of the packets that will be accepted from a customer.

The IETF Next Steps In Signaling (NSIS) Working Group is working on a protocol to meet new signalling requirements of today's IP networks (see RFC3726). The QoS signalling application protocol of NSIS is fundamentally similar to RSVP, but it has several new features, such as supporting different QoS Models. One of the QoS models under specification is Resource Management in DiffServ (RMD) (see draft-ietf-nsis-rmd-06.txt (work in progress)). RMD defines scalable admission control methods for DiffServ networks, so that interior nodes inside an AS do not possess per-flow state information, but only aggregated states (e.g., aggregated reserved bandwidth instead of knowing each flow's individual reservation). Similarly to RSVP, RMD also uses soft states to which explicit release of resources is added.

The 'stateless' domain property means that, in the AS, the interior nodes do not maintain per-flow state information, but only aggregated states (e.g., per-class). However, even in stateless AS, the ingress and egress edges are stateful nodes. In RMD, the end-to-end reservation is divided into per-AS reservation (between stateful edge nodes) and per-hop reservation (local reservation inside the AS).

Reference is now made to the drawings in which FIG. 1 shows a topology diagram of a prior art network 100 presenting state reservation information in relation to RMD. FIG. 1 shows three (3) AS (AS1 110, AS2 120, AS4 140). A network source 105 is connected to the AS1 110 and a network destination 145 is connected to the AS4 140. A communication is established between the source 105 and the destination 145, i.e. end-to-end. In the context of RMD, the source 105 therefore connects with an ingress router (IR) IR1 112 of the AS1. The IR1 112 is a stateful router, denoted SFR on FIG. 1. in turn, the IR1 112 connects within the AS1 110 to an egress router (ER) ER1 118. The ER1 118 is a stateful router, denoted SFR on FIG. 1. The connection between the IR1 112 and the ER1 118 in the AS1 goes through intermediate stateless routers 114 and 116 (denoted SLR on FIG. 1). FIG. 1 further shows a dotted arrow 110' between the IR1 112 and the ER1 118 to show the AS-wide reservation therebetween.

The ER1 118 then further connects with the AS2 120 via an IR IR2 122 (SFR). A dotted arrow 119 shows the inter-AS reservation established between the ER1 118 and the IR2 122. The structures shown above thereafter repeats themselves in the AS2 120 and in the AS4 140 and between the AS2 120 and the AS4 140. The last egress router ER4 148 (SFR) of the AS4 140 finally connects with the destination 145, thereby enabling end-to-end communication from the source 105 to the destination 145.

All practical resource reservation protocols (RSVP/NSIS/RMD) rely on routing protocols to assign a path for an incoming flow. They further rely on the fact that the routing protocol's messages are also routed on the path used to transit regular user packets (once a positive admission decision is taken). However, the opposite relationship is not true in practice. More precisely, the routing protocols (e.g., Open shortest path first (OSPF), Intermediate System to Intermediate System (IS-IS) or Border gateway protocol (BGP)) do not rely on the reservation protocol when assigning paths. That is, when an existing link or node goes down, the routing protocols calculate a new path based on their own optimization criteria and own metrics (e.g. choosing the lowest cost path). As a result, traffic flows may easily be rerouted to a path that is already occupied or that do not fulfill the flows requirements (i.e., no reservation established for the re-routed flows on the new path). This can lead, for instance, to potential severe congestion problems and to unmeet QoS requirements.

In an exemplary case of congestion created by a situation similar to the above description, squashed reservations thus need to be taken care of by the resource reservation protocol that created them. In cases where the resource reservation protocol maintains per-flow states in all interior nodes of an AS, the interior node that re-routes the traffic re-initialize the reservations of the re-routed flows after the new path establishment. This is referred to as 'Local Repair' in the context of RSVP. The node that re-routes the traffic utilizes its per-flow database to send out reservation update messages for all re-routed flows onto the new path, thereby trying to reserve a ppropriate QoS characteristics. If the reservation on the new path is not successful, the excess flows are terminated. In cases where the resource reservation protocol does not maintains per-flow states in all interior nodes of an AS (i.e. stateless interior nodes), the AS edge nodes have to resolve the congestion. In some such cases, the role of the interior nodes can be extended to report overload, using packet marking techniques, towards the egress edge nodes. After reception of marked packets, the egress edge nodes are able to terminate the required number of flows in order to maintain the required QoS for the rest of the flows. Examples of resource reservation protocol with stateless interior nodes include the RSVP aggregation method, the QoS-NSIS Signaling Layer Protocols aggregation methods and RMD. Therefore, as mentioned above, they cannot initiate reservations in a new route in case of rerouting to ensure QoS for the active flows.

A few typical state maintenance approaches (used for QoS and other purposes) are thereafter presented in order to clarify the rest of the discussion on the topic of state maintenance in routers.

In pure soft-State approach, a signalling sender sends a trigger message that contains state installation or update information to a signalling receiver, and starts a state refresh timer (with value T). When the state refresh timer expires, the signalling sender sends out a refresh message containing the most up-to-date signalling state information, and resets the refresh timer. Trigger and refresh message are sent in a best effort (unreliable) manner. When a trigger or refresh message is received at the signalling receiver, the corresponding signalling state information is recorded and a state time-out timer (with value X) associated with this state is started (or restarted if it was already running). Signalling state at the signalling receiver is removed only when its state time-out timer expires; that is, state will be maintained as long as the receiver continues to receive refresh messages before the state time-out timer expires. This time-out could occur because the signalling sender is no longer sending refresh messages (because its local state has been removed and it thus wants the remote state to be removed at the signalling receiver), or because refresh messages have been lost in transmission, and have resulted in a state time-out at the signalling receiver. The latter case is usually referred to as false removal of state, since the signalling sender did not intend for this state to be removed.

Soft-state with Explicit Removal is similar to the pure soft state approach, with the addition of an explicit state removal message. When state is removed at the signalling sender, the sender sends a best effort (unreliable) signalling message to the signalling receiver carrying explicit state removal information. State refresh and trigger messages, and a state time-out timer are all employed as in the case of pure soft state.

Getting back to the congestion case at hand, RSVP aggregation method and NSIS QoS-NSLP aggregation methods use either the Soft State or Soft-state with Explicit Removal approach. Neither of them specifies an algorithm to solve congestion situation occurring after re-routing. These methods have to rely on soft state refresh algorithm, which has at least the two following identified weaknesses. First, refresh messages are sent relatively rarely, typical value is 30 s, therefore, congestion notification is slow. Some network types, for example mobile access networks, require much faster congestion notification algorithms that restore normal operating conditions within a few 100 ms. Secondly, using standard procedures, admission control decision can be done only for the whole aggregate, because there is no information about the level of congestion.

The RMD protocol defines a severe congestion notification and handling algorithm. This congestion handling solution of RMD has only dealt with intra-AS rerouting. That is, only when the intra-AS path changes between the existing ingress and egress edge nodes. However, in operational IP networks, it may easily come to a rerouting involving the edge nodes, too. For instance, we could imagine losing a link between the ER1 118 and the IR2 122. This means that flows may get re-routed in a way that a new (egress) edge node is chosen, and potentially a completely different inter-AS path is used after the re-routing point (i.e., different ASs with different ingress edge and egress nodes).

The failure of an inter-AS link (e.g., the ER1 118 to the IR2 122) most likely results in inter-AS re-routing. However, even an intra-AS link failure may cause inter-AS re-routing. For example this happens, if there is no alternative route between the previous edge nodes (e.g. the link from the SLR 116 to the ER1 118 might be the only one from the SLR 114 and 116). Intra-AS link failure may also cause inter-AS re-routing if 'hot-potato' routing is used and a new route would be longer than another one between different edge nodes. In practice, at the moment, inter-AS re-routing means that BGP selects a new best path (not shown) for future use, and installs a new inter-AS next-hop (not shown) to the forwarding tables of the appropriate routers.

As said above, re-routing to a new path where there was no reservation for re-routed flows may cause severe congestion. Unfortunately, in cases of inter-AS re-routing case, the intra-AS severe congestion handling mechanisms are not effective enough. Since the new edge nodes do not possess state information about the re-routed flows, they cannot select them to terminate. As a consequence, only those pre-existing flows (i.e. that have already a state installed in the new egress edge node) can be chosen to be terminated. However, those flows did not experience re-routing. Due to the constraint that the new edge node can only select to terminate flows from a subset of all flows causing congestion, the severe congestion handling mechanism is slower. Moreover, since the re-routed flows cannot be terminated due to the absence of their state information in the egress edge node, they will penetrate the neighboring AS in which they do not have any reservation states installed. Yet again, they may cause congestion in therein. Thus, the congestion could even propagate out of the original AS towards the destination. It is further a common practice today is that inter-AS traffic is controlled by Service Level Agreements (SLA) between peering ASs. In this case, rerouting traffic may violate the SLA leading to potential consequences that may be specified in the SLA.

Due to the periodical soft-state refreshes, the re-routed flows will sooner or later have their states refreshed (or installed where there has not been one previously). However, this may take as long as a complete refresh interval, i.e. 30 seconds, which is unacceptable at least in some delay-sensitive network configurations. The refresh interval is especially problematic as the re-routed flows could trigger multiple congestion situations in the original and forthcoming AS.

Re-applying the 'Local Repair' procedure of RSVP is also deficient in reduced-state reservation protocol. For instance, the IR1 112 has per-flow states and can, thus, potentially identify re-routed flows. As soon as it receives indication of the new path, the IR1 112 can further send a refresh message towards the destination, just like in RSVP 'Local Repair'. However, since the interior routers 114, 116 do not maintain per-flow states, they cannot know whether the refresh message belongs to an already existent flow or to a new (i.e. re-routed) flow. In the first case, the reservation is wrongfully added to the reservation list. In the second case, the reservation is correctly added. However, at least in some cases (but, in practice, in a majority of cases), only a part of the original intra-AS path has changed, leading to double reservation for flows on the unchanged portion(s) of the new path.

As can be appreciated, prior art related to update of state information in edge routers presents many deficiencies. As a consequence of those deficiencies, a reservation can be doubled unduly, only a partial list of paths traversing a given edge router can be terminated to solve congestion issues and can cause a congestion problem to propagate to other neighboring AS. The present invention provides a solution that aims at improving, amongst other things, from those deficiencies.

SUMMARY

This invention describes a mechanism that can restore state information related to QoS for data flows following a re-routing event affecting more than one Autonomous System (AS). It can usually help in preventing or curing potential severe congestion issues arising from such re-routing. This is also suitable for real-time data, while it is not limited thereto. Some of the achievements of the new mechanism can be shortly described as follows. It does not represent an exhaustive list of advantages. It does not either represent an attempt at describing the function of the invention. It is rather a list of some of the accomplishments of the invention. Thus, the solution described at length further below through exemplary implementations can:

enable the intra-AS severe congestion handling algorithms to remain effective;
avoid propagation of congestion to other ASs;
avoid double reservations; and
work fast enough to avoid congestions and quickly restore QoS.

A first aspect of the present invention is directed at an edge router (212, 700) in a network (200) comprising a plurality of Autonomous Systems, AS (210, 220, 230, 240). A data session is established on a path (310) from a source (205) connected to the edge router (212, 700) of a first one of the plurality of AS, AS_S (210), towards a destination (245) connected from the source (205) via a second one of the plurality of AS, AS_D (240). The path (310) has appropriate resources reserved in the plurality of AS (210, 220, 240). A modification to the data session changes at least a portion of the path (310) into a modified path (342). The edge router comprises a Routing Engine, RE (710) and a Resource Management Module, RMM (720). The RE comprises at least one routing table (716) and at least one Routing Protocol module (712, 714) using the at least one routing table (716). The RMM detects the modification to the data session (510), creates an edge-router-refresh message (810) and sends it towards the destination (245) on the modified path (342). edge-router-refresh message (810). The edge-router-refresh message (810) comprises an identifier (820) of the data session, an identifier (830) of the edge router (212, 700) and an indication (840) that the edge-router-refresh message (810) is meant to be used by edge routers (700, 218B, 232, 238) present on the modified path (342).

A second aspect of the invention is directed to a method for advertising a modification to a data session in a network (200). The network (200) comprises a plurality of Autonomous Systems, AS (210, 220, 230, 240). The data session is established on a path (310) from a source (205) connected via a first one of the plurality of AS, AS_S (210), towards a destination (245) connected from the source (205) via a second one of the plurality of AS, AS_D (240). The path (310) has appropriate resources reserved in the plurality of AS (210, 220, 240). The modification to the data session changes at least a portion of the path (310) into a modified path (342). The method, following the modification, comprises the steps of detecting the modification to the data session (510) in a Resource Management Module, RMM (720), of an Edge Router of the AS_S, IER (212, 700), creating an edge-router-refresh message (810) in the RMM (720) of the IER (212, 700) and sending the edge-router-refresh message (810) from the IER (212, 700) towards the destination (245) on the modified path (342). The edge-router-refresh-message (810) comprises an identifier (820) of the data session, an identifier (830) of the IER (212, 700) and an indication (840) that the edge-router-refresh message (810) is meant to be used by edge routers (700, 218B, 232, 238) present on the modified path (342).

A third aspect of the invention is directed to a method in an edge router (700, 218B, 232, 238) for updating state information related to a data session in a network (200). The network (200) comprises a plurality of Autonomous Systems, AS (210, 220, 230, 240). The edge router is on the edge of one of the plurality of AS, AS_E (210, 230, 240) and the data session is established on a path (310) from a source (205) connected to a first edge router acting as an ingress edge router IER (212, 700) of a first one of the plurality of AS, AS_S (210), towards a destination (245) connected from the source (205) via a second one of the plurality of AS, AS_D (240). The path (310) has appropriate resources reserved in the plurality of AS (210, 220, 240). A modification to the data session changes at least a portion of the path (310) into a modified path (342). The method comprises the steps of receiving (410) an edge-router-refresh message (810) in the edge router (700, 218B, 232, 238) and determining (420) in the edge router (700, 218B, 232, 238) if appropriate state exists for the modified path (342) and, if not, creating the appropriate state. The edge-router-refresh message (810) comprises an identifier (820) of the data session, an identifier (830) of an Originating Edge Router (212, 700), which issued the edge-router-refresh message (810) and an indication (840) that the edge-router-refresh message (810) is meant to be used by the edge routers (700, 218B, 232, 238) present on the modified path (342).

A fourth aspect of the present invention is directed to an edge router (700, 218B, 232, 238) in a network (200) comprising a plurality of Autonomous Systems, AS (210, 220, 230, 240). The edge router is on the edge of one of the plurality of AS, AS_E (210, 230, 240) and a data session is established on a path (310) from a source (205) connected to a first edge router acting as an ingress edge router IER (212, 700) of a first one of the plurality of AS, AS_S (210), towards a destination (245) connected from the source (205) via a second one of the plurality of AS, AS_D (240). The path (310) has appropriate resources reserved in the plurality of AS (210, 220, 240). A modification to the data session changes at least a portion of the path (310) into a modified path (342). The edge router comprises a Routing Engine, RE (710) and a Resource Management Module, RMM (720). The RE (710) comprises at least one routing table (716) and at least one Routing Protocol module (712, 714) using the at least one routing table (716). The RMM (720) receives (410) an edge-router-refresh message (810) and determines (420) if appropriate state exists for the modified path and, if not, creates the appropriate state. The edge-router-refresh message (810) comprises an identifier (820) of the data session, an identifier (830) of an Originating Edge Router (212, 700), which issued the edge-router-refresh message (810) and an indication (840) that the edge-router-refresh message (810) is meant to be used by the edge routers (700, 218B, 232, 238) present on the modified path (342).

A fifth aspect of the present invention is directed to an edge-router-refresh network signalling message (810) created by an edge router (212, 700) located in a network (200) comprising a plurality of Autonomous Systems, AS (210, 220, 230, 240). A data session is established on a path (310) from a source (205) connected via a first one of the plurality of AS, AS_S (210), towards a destination (245) connected from the source (205) via a second one of the plurality of AS, AS_D (240). The edge-router-refresh message (810) comprises an identifier (820) of the data session, an identifier (830) of the edge router (212, 700), which issued the edge-router-refresh message (810) and an indication (840) that the edge-router-refresh message (810) is meant to be used by the edge routers (700, 218B, 232, 238) present on the modified path (342). Optionally, the edge-router-refresh network signalling message (810) further comprises a list (850) of the plurality of AS (210, 220, 240) traversed by the path (310) before the modification.

BRIEF DESCRIPTION OF THE DRAWINGS

A more complete understanding of the present invention may be had by reference to the following Detailed Description when taken in conjunction with the accompanying drawings wherein.

DETAILED DESCRIPTION

This invention describes a mechanism that can restore state information related to QoS for data flows following a re-routing event affecting more than one Autonomous System (AS). It can usually help in preventing or curing potential severe congestion issues arising from such re-routing. This is also suitable for real-time data, while it is not limited thereto. Some of the main technical elements of the invention are described shortly in the following list. This is not an exhaustive list of the technical features of the invention and should not be interpreted as listing essential features of the invention. It is rather a list of some of the highlights of the invention. Thus, in the solution described at length further below through exemplary implementations:

A new upcall interface is defined between a routing engine and a resource management module in the edge routers. The resource management module is thereby notified about an inter-AS route change immediately after the routing engine updates its routing table. The notification from the routing engine to the resource management module can consist of a list of affected destination IP address prefixes and, optionally, the list of autonomous systems identifiers (AS_Path) of the previous path;

A new signalling message is sent from the ingress router towards the destination on the data path for each re-routed flow after an inter-AS route change. This new signalling message is similar to a reservation refresh message in the sense that it builds the necessary states in the egress router if there is no such installed. However, it is not meant to be processed in interior routers of the AS like other refresh messages. Optionally, the message also delivers the AS_Path acquired during the upcall above;

A series of steps to be done by an egress router upon reception of the new signalling message is provided. It specifies steps for creating the necessary states for the flow and sending the new signalling message towards the destination through the neighboring AS;

A series of steps to be done by an ingress router upon the reception of the new signalling message is provided comprising creating the necessary states for the flow and either sending the new signalling message towards the destination or starting a new reservation; and An indication within the new signalling message that it is meant to be used by edge routers. For example, in NSIS QoS Application protocol, a new global Reservation Sequence Number could defined and used to distinguish between a reservation message and a refresh messages that is sent to a new path.

Figure 1:
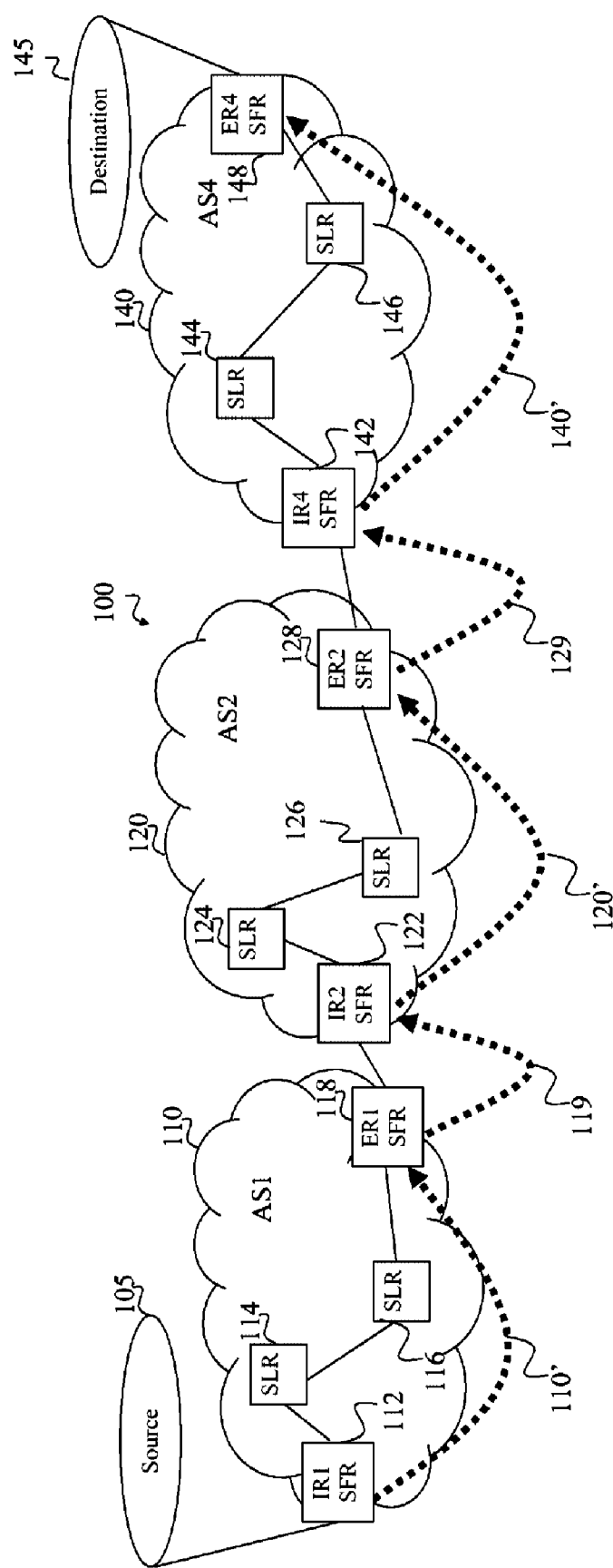
FIG. 1 is a topology diagram of a prior art network presenting state information in relation to RMD.
Figure 2:
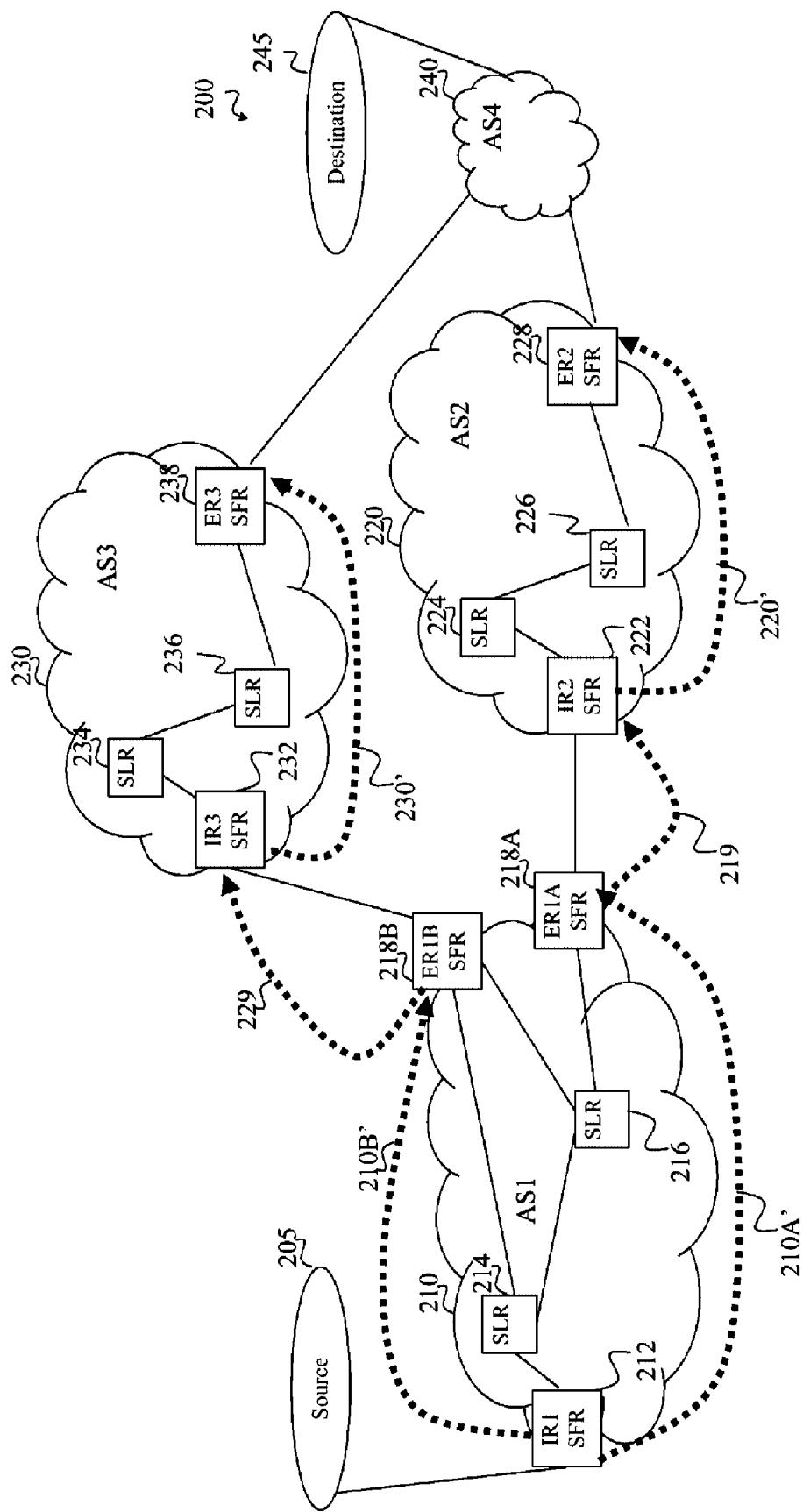
FIG. 2 is an exemplary topology diagram of a network in accordance with the teachings of the present invention.

Reference is now made to FIG. 2, which shows an exemplary topology diagram of a network 200 in accordance with the teachings of the present invention. A source 205 has an established data session towards a destination 245 over an end-to-end path (not explicitly shown, referred to as path hereinafter). The path starts at an edge router acting as an ingress router (IF1) 212 for the data session. The IF1 212 is part of a first Autonomous System (AS1) 210. The IF1 212 is stateful with regards to the path, i.e. it keeps track of information related to a QoS reservation of the data session over at least a portion of the path. Within the AS1 210, the path traverses two stateless routers 214, 216 before reaching an edge router acting as en egress router (ER1A) 218A for the data session within the AS1 210. The stateless routers 214, 216, as their name indicates, do not maintain QoS information related to the path. Two stateless routers 214, 216 are shown on FIG. 2 for clarity reasons, but it should be understood that the number of such routers could vary from 0 (even if usual implementations have at least 1) to a very large number without interfering with the teachings of the present invention. The same comments applies throughout the present description. The ER1A 218A is a stateful router that keeps track of information related to a QoS reservation of the data session over at least a portion of the path. On FIG. 2, an arrow 210A' is shown to illustrate the path without recourse to the data route as such, but rather with regards to the locations of state information on the path.

From the ER1A 218A, the path continues towards AS2 220, where it is received by an edge router acting as an ingress router (IF2) 222 for the data session within the AS2 220. Just as mentioned above, an arrow 219 is added between the ER1A 218A and the IR2 222. The path thereafter continues within the AS2 220 through stateless routers 224, 226 to an edge router acting as en egress router (ER2) 228 for the data session with the AS2 220. An arrow 220' is added similarly to the arrows 210A' and 219. The EF2 228 thereafter connects on the path towards the destination through AS4 240, which in turn connects to the destination 245. The topology content of the AS4 240 is not shown on FIG. 2 to simplify the presentation thereof, but it should readily be understood that the AS4 240 has a structure similar to the ones already presented for the AS1 210 and the AS2 220. The path is thus thereby completed from the source 205 to the destination 245.

Further elements are shown on FIG. 2 in order to facilitate comprehension of exemplary implementations in the next Figures. Thus, FIG. 2 also shows an edge router having a potential for acting as en egress router (ER1B) 218B for the data session within the AS1 210. It is connected from the IF1 212 via the stateless router 214 or, alternatively, via the stateless routers 214 and 216. An arrow 210B' is further added. An AS3 230 is also shown connected from the ER1B 218B via an edge router having a potential for acting as an ingress router (IF3) 232 for the data session. An arrow 229 is also added. The IF3 232 further connects towards an edge router having a potential for acting as en egress router (ER3) 238 for the data session within the AS3 230. An arrow 230' is added between the IF3 232 and the ER3 238. The ER3 238 connects toward the destination via the AS4 240. As explained above, details were omitted in the AS4 240 to simplify the presentation of FIG. 2.

Figure 3:
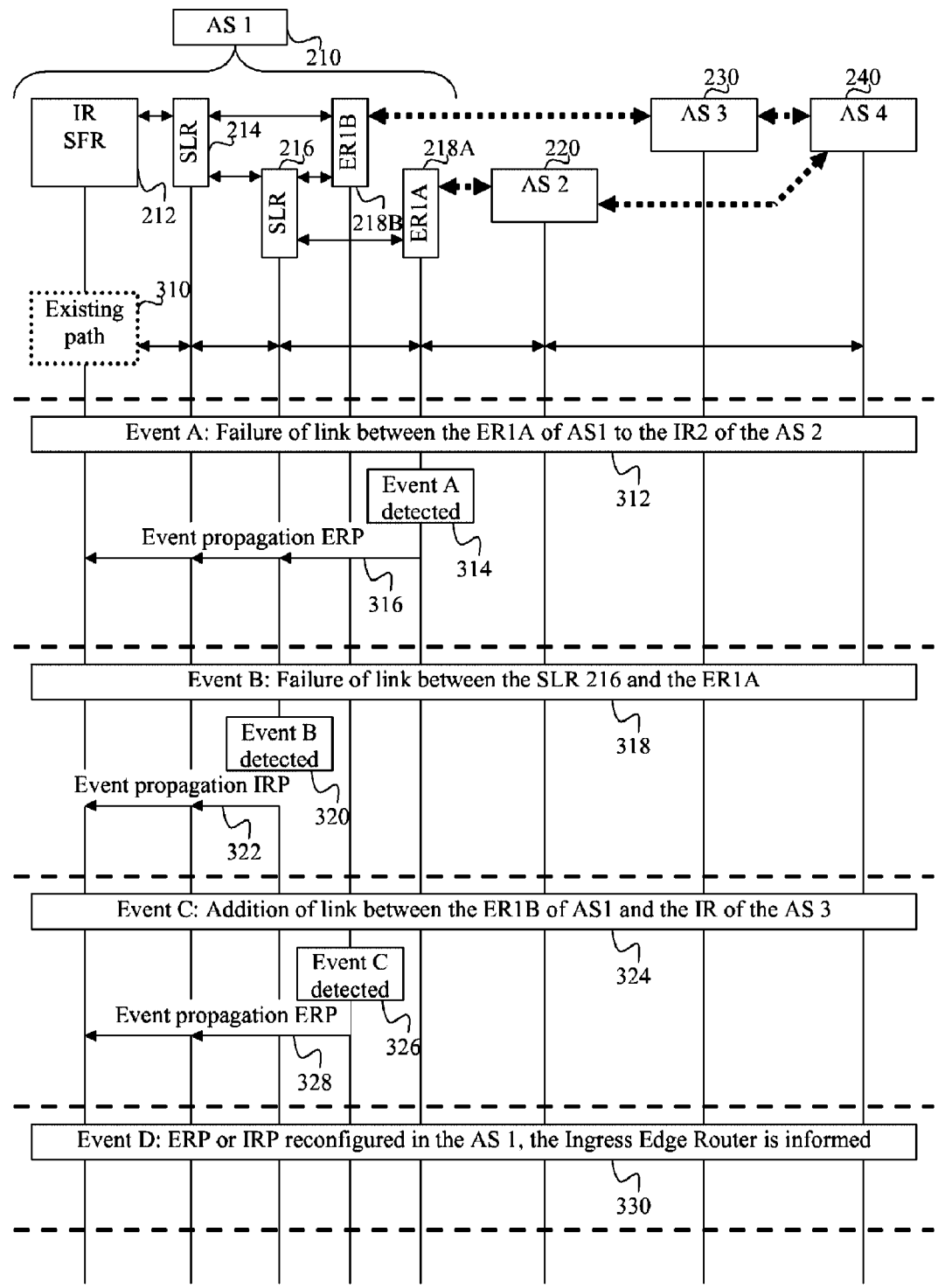
FIG. 3 is a nodal operation and signal flow chart of an exemplary implementation in accordance with the teachings of the present invention.
Figure 3:
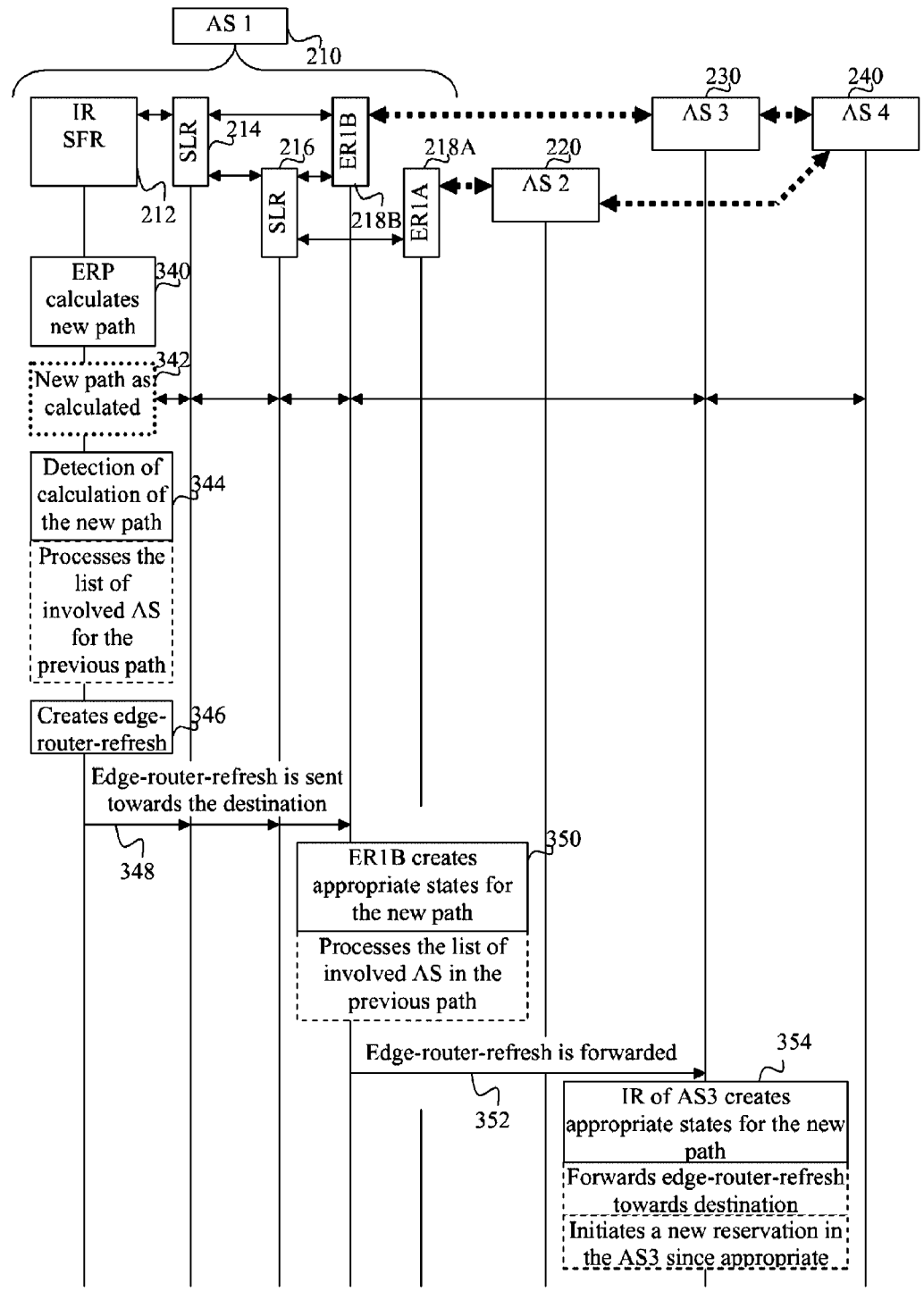

FIG. 3 shows (on two pages referred to together as FIG. 3) a nodal operation and signal flow chart of an exemplary implementation in accordance with the teachings of the present invention. It is worth mentioning at this point that similar elements are designated with identical reference numerals throughout the several views of the Figures. The topology content of the AS1 210 is shown while the AS2 220, the AS3 230 and the AS4 240 are presented in an aggregated format to simplify the global presentation of FIG. 3.

The path mentioned with regards to the description of FIG. 2 is represented by an existing path 310 in FIG. 3. The dotted box 310 further represents the potential steps taken in the IR1 212 to establish the existing path 310 and its associated states. The intricacies of the existing path 310 establishment falls outside the scope of the present invention. Suffice is to say that the path exists with states installed in all edge routers thereof.

FIG. 3 follows with several examples of events 312, 318, 324, 330 triggering, in part or in totally, the logic of the present invention. While many of the events 3112, 318, 324 and 330 could occur simultaneously, they are shown independently on FIG. 3 with the resulting actions being shown on the continued page of FIG. 3.

The event A 312 corresponds to a failure of the link between the ER1A 218A of the AS1 210 and the IR2 222 of the AS2 220, i.e. the inter-AS link between the AS1 210 and the AS2 220. The ER1A 218A detects the event A 312 (step 314) via an External Routing Protocol (ERP, e.g., BGP) used between the AS1 210 and the AS2 220. The ERP provides the necessary mechanism for the detection 314 to happen. The mechanics thereof fall outside the scope of the present invention. Following the detection 314, the ER1A 218A propagates the event information 316 at least on the opposite direction of the existing path 310. It should be mentioned that other sub-events within the AS2 220 or further ASs towards the destination 245, such as an outage of the stateless router 226, could have the same effect on the ERP towards the ER1A 218A.

The event B 318 corresponds to a failure of the link between the stateless router 216 and the ER1A 218A within the AS1 210. The stateless router 216 detects the event B 318 (step 320) via an Internal Routing Protocol (e.g. IS-IS, OSPF) used within the AS1 210. The IRP provides the necessary mechanism for the detection 320 to happen. The mechanics thereof fall outside the scope of the present invention. Following the detection 320, the stateless router 216 propagates the event information 322 at least on the opposite direction of the existing path 310.

The event C 324 corresponds to advertisement of the link between the ER1B 218B of the AS1 210 and the IR3 232 of the AS3 220, i.e. the inter-AS link between the AS1 210 and the AS3 230. The ER1B 218B detects the event A 324 (step 326) via an ERP used between the AS1 210 and the AS3 230. The ERP provides the necessary mechanism for the detection 326 to happen. The mechanics thereof fall outside the scope of the present invention. Following the detection 326, the ER1B 218B propagates the event information 328 at least on the opposite direction of the existing path 310.

The event D 330 relates to a reconfiguration of the IRP that is used within the AS1 210 or the ERP that the AS1 210 uses with its neighboring ASs. The reconfiguration can take many forms (e.g. modification of attributes/addition/deletion of internal or external routes/SLA). In the end, the event D 330 triggers the same result as the other events 312, 318 and 324, i.e., a calculation of a new path 342 (step 340) by the ERP of the AS1 210. It should further be noted that the events 312, 318, 324 and 330 only represent exemplary events and that many other possibilities exist to trigger the step 340, without impacting the teachings of the present invention. The internal algorithm used by the ERP to calculate the new path 342 in the step 340 and its establishment towards the destination 245, from a data routing perspective, fall outside the scope of the present invention. In the present case, new path 342 is formed by the links from the IR1 212 to the stateless router 214 and 216 to the ER1B 218B, which in turn connects to the AS3 230 via the IR3 230 toward the AS4 240 and the destination 245. As can be readily understood, the resulting new path 342 is only an example of many possible paths that could have been calculated. The new path 342 was chosen for simplicity reason to illustrate the teachings of the present invention.

After the calculation 340, the IR1 212 detects at least one of the calculation step 340 and the new path 342 itself (step 344). The detection 344 can be done in various ways. A possibility is that a portion of TR1 212 responsible for the ERP (e.g. a routing Engine (RE)) informs another portion of IR1 212 responsible for state information maintenance (e.g. Resource Management Module (RMM)). The detection 344, when done from the RE to the RMM can be referred to as an upcall, wherein the RMM has an upcall interface for receiving the information related to the calculation 340 of the new path 342. The detection 344 can also be done through monitoring or inspection of other information maintained by the RE (e.g. routing tables) or by monitoring or inspection of packets received at the IR1 212 or issued from the IR1 212. Optionally (as shown by the dotted box), the detection 344 may comprise processing of information related to the (existing and now previous) path 310. The processing aspect of the detection 344 aims at obtaining a list of all AS (AS_Path) that were traversed by the previous path 310. This list can be obtained via the upcall interface introduced earlier or by other means.

Once the detection 344 is done, the IR1 212 creates an edge-router-refresh message 346, which at least contains an identifier of the data session related to the previous path 310 and the new path 342 (e.g. source port/address, destination port/address and Differentiated Services Code Point (DSCP)), an address of the IR1 212, an indication that the message is intended for routers acting as edge routers only and, optionally, the AS_Path list potentially processed in the detection 344. The address of the IR1 212 can be used to, amongst other things, identify the source of the edge-router-refresh message 346. The indication that the message is intended for routers acting as edge routers can take the form of a new global Reservation Sequence Number identifying the type of the message 346. Once created, the edge-router-refresh message is sent 346 towards the destination 245, i.e. on the new path 342. Upon reception of the edge-router-refresh message 346 the stateless routers 214, 216 simply forward it (step not shown) as they would do for data traffic. Optionally, they could also be modified to understand that the edge-router-refresh 346 is related to signalling traffic and treat it accordingly. However, the stateless routers 214, 216 do not inspect the edge-router-refresh message 346 to locally modify state information related to the new path 342.

Upon reception of the edge-router-refresh message 346, the ER1 218B, which was not involved in the previous the 310, creates appropriate local state information for the new path 342. If the ER1B 218B had been involved in the previous path 310, it would have updated its state information related thereto instead of creating it.

Following the step 350, the ER1B 218B forwards the edge-router-refresh message 346 into an edge-router-refresh message 352 towards the destination 245, i.e. on the new path 342. Upon reception of the edge-router-refresh message 352, the IR3 232 creates appropriate state information for the new path 342. Again, as mentioned for the ER1B 218B, if the IR3 232 had been involved in the previous path 310, it would have updated its state information related thereto instead of creating it. If, as in the present example, the IR3 230 was not involved in the previous path 310, then the edge-router-refresh message 352 is further forwarded toward the destination 245, i.e. on the new path 342. It is preferred to proceed with the forward even if the IR3 230 was involved in the previous path 310 as there is still a potential for changes from the previous path 310 to the new path 342 on the portion towards the destination 245. However, in some implementations, the edge-router-refresh message 352 could be forwarded only if the IR3 230 was not involved in the previous path 310 with the assumption that the previous path 310 and the new path 342 correspond therefrom towards the destination 245. Optionally, if the edge-router-refresh message 352 comprises AS_Path and if appropriate (e.g. if the IR3 230 is equipped therefor), the IR3 230 can inspect it to detect if the AS3 230 to which it is attached was part of the previous path 310. In the present example, the AS3 230 was not part of the previous path 310 and the IR3 230 is likely to trigger local refresh within the AS3 230. This is done in an appropriate manner in view of, amongst other things, an IRP used within the AS3 230.

Figure 4:
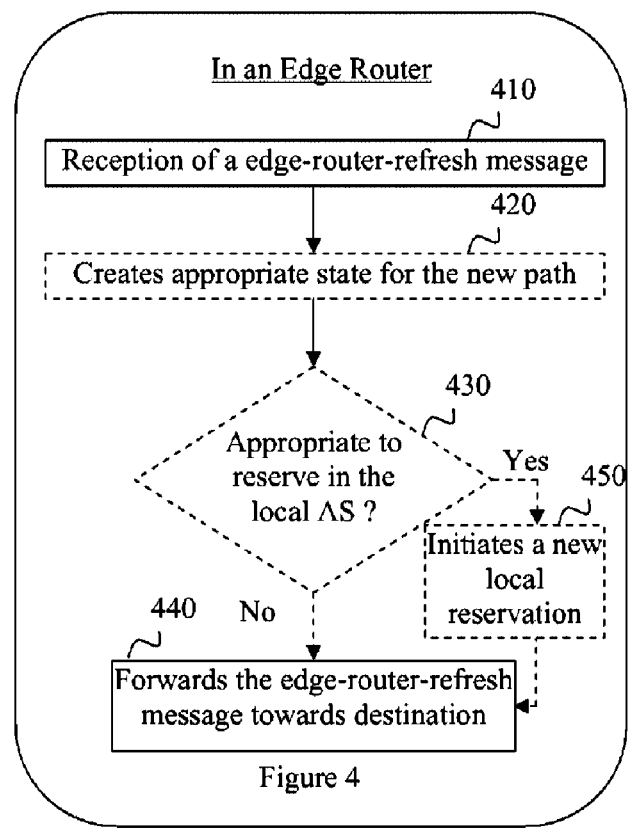
FIG. 4 is a flow chart of an algorithm executed by an ingress edge router upon reception of a edge-router-refresh message in accordance with the teachings of the present invention.

FIG. 4 shows a flow chart of an algorithm executed by an edge router (acting either as an ingress edge router or an egress edge router) upon reception of a edge-router-refresh message in accordance with the teachings of the present invention. The example used in FIGS. 2 and 3 will be reused thereafter to increase simplicity of the description. The method shown is executed in an edge router (e.g. 218A or 232) for updating state information related to the data session in the network 200. At the beginning of the method, the data session is established on the path 310 from the source 205 towards the destination 245. The path 310 has appropriate resources reserved in the plurality of ASs 210, 220, 240 traversed by the path 310. When a modification to the data session changes at least a portion of the path 310 into a new path 342, the following steps of the method are executed. First, the edge router receives (step 410) an edge-router-refresh message comprising:

an identifier of the data session;

an identifier (e.g. an IP address) of an Originating Edge Router (i.e. the IR1 212), which issued the edge-router-refresh message; and an indication that the edge-router-refresh message is meant to be used by the edge routers present on the modified path 342.

If appropriate state does not exist for the modified path 342, the appropriate state is created (step 420). As mentioned above, it is appropriate to create appropriate state if the edge router was not on the previous path 310.

Options of the method include determining (step 430) in the edge router if it is appropriate to reserve resource in its AS. If it is appropriate, the edge router initiates reservation in its AS (step 450). If it is not appropriate (e.g. in case of an ingress edge router) or systematically (in case of an egress router), the edge router can further forward (step 440) the edge-router-refresh message towards the destination 245 on the modified path 342.

The edge-router-refresh message (810) may further comprise a list of the plurality of AS (e.g. 210, 220, 240) traversed by the path 310 before the modification. In such a case, the determination 430 is performed by determining that it is appropriate to reserve resource in the edge router's AS if it is not on the list comprised in the edge-router-refresh message.

Figure 5:
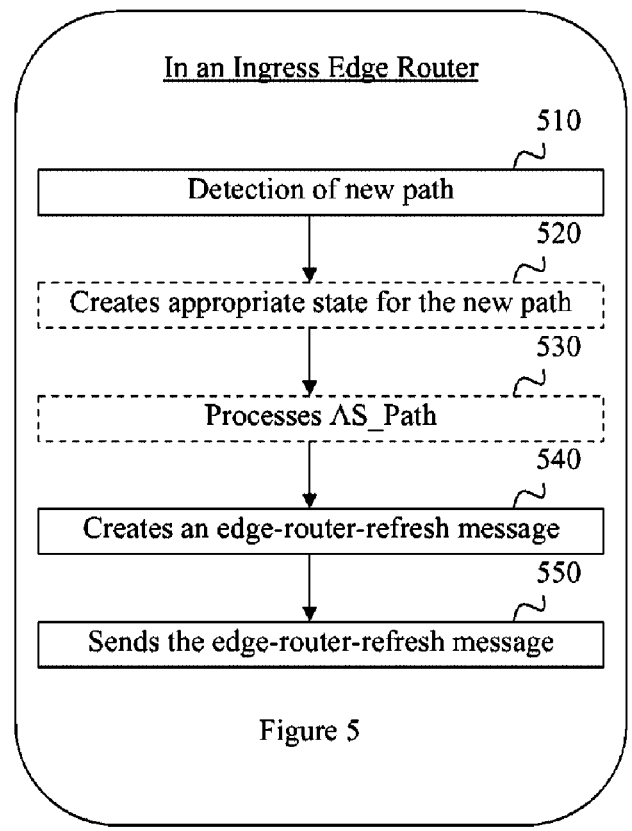
FIG. 5 is a flow chart of an algorithm executed by an ingress edge router upon detection of a new path in accordance with the teachings of the present invention.

FIG. 5 shows a flow chart of an algorithm executed by an edge router acting as an ingress edge router upon detection of a new path in accordance with the teachings of the present invention. The example used in FIGS. 2 and 3 will be reused thereafter to increase simplicity of the description. The method shown is executed for advertising a modification to the data session. At the beginning of the method, the data session is established on the path 310 from the source 205 towards the destination 245. The path 310 has appropriate resources reserved in the plurality of AS (210, 220, 240). When a modification to the data session changes at least a portion of the path 310 into a new path 342, the following steps of the method are executed.

The edge router detects the modification to the data session (step 510) into the new path 342. The step 510 can be performed in a Resource Management Module (RMM) of the edge router. It should be readily understood that the RMM structure and associated name is there as one working implementations known to the inventors and that other structures could perform the same tasks in the different arrangement. If appropriate, the RMM of the edge router may create appropriate state (step 520) for the modified path 342. Thereafter, the edge router creates (step 540) an edge-router-refresh message in the RMM (720) comprising:

an identifier of the data session;

an identifier of the edge router; and an indication that the edge-router-fresh message is meant to be used by a RMM of edge routers present on the modified path 342.

The edge-router-refresh message thus created is further sent (step 550) from the edge router towards the destination 245 on the modified path 342. The edge router may further process the AS_Path information (step 530) in order to include a list of the plurality of AS (e.g. 210, 220, 240)

traversed by the path 310 before the modification in the edge-router-refresh message. The list itself may have been received or obtained during the detection step 510.

Furthermore, the detection 510 may be performed by receiving an indication of the modification in the RMM from a Routing Engine (RE) of the edge router. The indication may have been issued from one of an Internal Routing Protocol (IRP) module and an External Routing Protocol (ERP) module of the Routing Engine. Furthermore, the indication may have been issued following a modification in at least one of a plurality of Routing Tables of the Routing Engine of the edge router.

Figure 6:
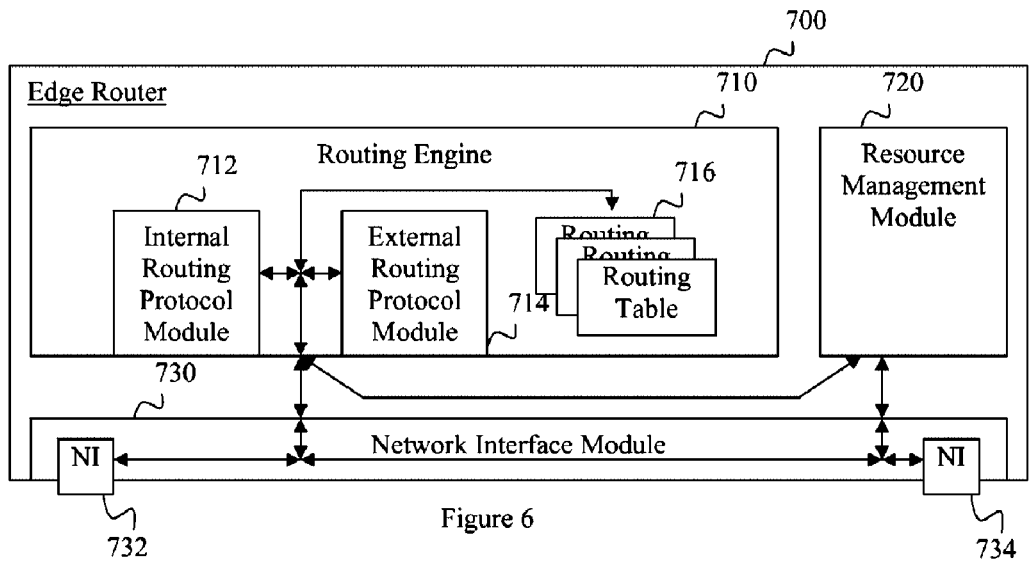
FIG. 6 is a modular representation of an edge router in accordance with the teachings of the present invention.

FIG. 6 is a modular representation of an edge router 700 in accordance with the teachings of the present invention. The edge router 700 comprises a network interface module 730, a Routing Engine (RE) 710 and a Resource Management Module (RMM) 720. The network interface module 730 manages a plurality of network interfaces (NI) 732, 734. The RE 710 comprises a plurality of routing tables 716, an Internal Routing Protocol (IRP) module 712 and an External Routing Protocol (ERP) module (714). The IRP module 712 participates to routing of data packets within the edge router's AS using at least one of the plurality of NI 732, 734 and at least one of the plurality of routing tables 716. The ERP module 714 participates to routing of data packets exchanged with a further AS using a second one of the plurality of NI 732, 734 and at least one of the plurality of routing tables 716.

The RMM 720 is capable of providing the functionality described with relation to FIG. 5. More precisely, the RMM detects the modification to the data session, creates an edge-router-refresh message and sends it towards the destination 245 on the modified path 342. As mentioned before, the edge-router-refresh message comprises:

an identifier of the data session;

an identifier (e.g. an IP address of the edge router); and an indication that the edge-router-fresh message is meant to be used by a RMM of edge routers present on the modified path 342.

The RMM 720 may also create appropriate state for the modified path 342 if needed. The edge-router-refresh message may further comprise a list of the plurality of AS traversed by the path 310 before the modification. In such a case, the RMM 720 may detect the modification by obtaining the list of the plurality of AS traversed by the path 310. Likewise, the list may be obtained by the RMM 720 during the detection. The RMM 720 may also detect the modification by receiving an indication of the modification from the RE 710. Such an indication may be issued from one of the IRP module 712 and the ERP module 714 of the RE 710. Furthermore, the indication may be issued following a modification in at least one the Routing Tables 716 of the RE 710.

The RMM 720 is also capable of providing the functionality described with relation to FIG. 4. That is, the RMM 720 is capable of receiving an edge-router-refresh message, determining if appropriate state exists for the modified path 342 and, if not, creating the appropriate state. The RMM 720 may further determine if it is appropriate to reserve resource in its AS and, if it is appropriate, initiates reservation therein. The RMM 720 may also further forward the edge-router-refresh message towards the destination 245 on the modified path 342.

Figure 7:
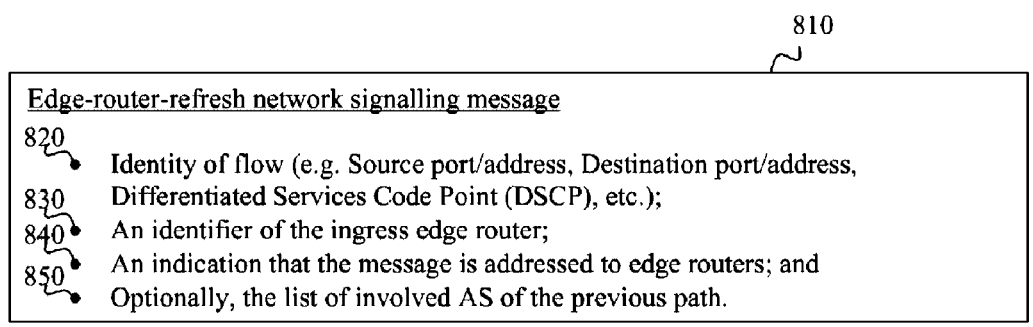
FIG. 7 is a schematic representation of an edge-router-refresh network signalling message in accordance with the teachings of the present invention.

Reference is now concurrently made to FIGS. 6 and 7, the latter showing a schematic representation of an edge-router-refresh network signalling message 810 in accordance with the teachings of the present invention. The edge-router-refresh message 810 comprises:

an identifier 820 of the data session;

an identifier 830 of an Originating Edge Router, which issued the edge-router-refresh message;

an indication 840 that the edge-router-refresh message is meant to be used by the edge routers present on the modified path 342; and may comprise a list 850 of the plurality of AS traversed by the path 310 before the modification (e.g. AS_Path).

In such a case, the RMM 720 may determine that it is appropriate to reserve resource its AS if it is not on the list thereby received.

The identifier 830 is likely to be one of the addresses of the edge router that created the edge-router-refresh message 810. In that sense, the identifier 830 is likely to be a routable identifier, but could also be any other kind of non-routable identifier. The identifier 850 can thus contain information enabling authentication of the source of the edge-router-refresh message 810 by the receiving routers. The authentication mechanism used in relation to the identifier 850 as such is outside the scope of the present invention.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

The invention claimed is:

1. An edge router in a network comprising a plurality of Autonomous Systems (AS), a data session being established on a path from a source connected to the edge router of a first one of the plurality of AS, towards a destination connected from the source via a second one of the plurality of AS, the path having appropriate resources reserved in the plurality of AS, wherein a modification to the data session changes at least a portion of the path into a modified path, the edge router comprising:

a Routing Engine (RE) comprising:
at least one routing table; and
at least one Routing Protocol module using the at least one routing table; and a Resource Management Module (RMM), that:
detects the modification to the data session;
creates a state for at least a portion of the modified path;
creates an edge-router-refresh message comprising:
an identifier of the data session;
an identifier of the edge router; and
an indication that the edge-router-refresh message is meant to be used by edge routers and not by stateless routers present on the modified path; and
sends the edge-router-refresh message towards the destination on the modified path for triggering creation of appropriate states in the edge routers present on the modified path.

2. The edge router of claim 1 further comprising a network interface module for managing a plurality of network interfaces, NI and wherein the at least one Routing Protocol Module comprises:

an Internal Routing Protocol module that participates to routing of data packets within the AS using at least one of the plurality of NI and the at least one routing table; and an External Routing Protocol module that participates to routing of data packets exchanged with a further AS using a second one of the plurality of NI and the at least one routing table.

3. The edge router of claim 1 wherein the RMM creates the state for at least a portion the modified path by updating a former state previously maintained for the path.

4. The edge router of claim 1 wherein the edge-router-refresh message further comprises:
a list of the plurality of AS traversed by the path before the modification.

5. The edge router of claim 4 wherein the RMM detects the modification by obtaining the list.

6. The edge router of claim 1 wherein the RMM detects the modification by receiving an indication of the modification from the Routing Engine.

7. The edge router of claim 6 wherein the indication is issued from the at least one Routing Module of the Routing Engine.

8. The edge router of claim 6, wherein the indication is issued from the at least one Routing Module of the Routing Engine following a modification in the at least one routing table of the Routing Engine.

9. The edge router of claim 1 wherein the identifier of the edge router is one of a routable identifier of the edge router or a non-routable identifier of the edge router.

10. The edge router of claim 1 wherein the identifier is a non-routable identifier of the edge router comprising authentication information.

11. A method for advertising a modification to a data session in a network, the network comprising a plurality of Autonomous Systems, (AS), the data session being established on a path from a source connected via a first one of the plurality of AS, towards a destination connected from the source via a second one of the plurality of AS, the path having appropriate resources reserved in the plurality of AS, wherein the modification to the data session changes at least a portion of the path into a modified path, the method, following the modification, comprising the steps of:
detecting the modification to the data session in a Resource Management Module, (RMM), of an Edge Router (IER) of the AS_S,;
creating in the RMM of the IER a state for at least a portion of the modified path;
creating an edge-router-refresh message in the RMM of the IER, the edge-router-refresh message comprising:
an identifier of the data session;
an identifier of the IER; and
an indication that the edge-router-refresh message is meant to be used by edge routers and not by stateless routers present on the modified path; and
sending the edge-router-refresh message from the IER towards the destination on the modified path for triggering creation of appropriate states in the edge routers present on the modified path.

12. The method of claim 11 wherein the step of:
creating in the RMM of the IER the state for at least a portion of the modified path is performed by updating a former state previously maintained for the path.

13. The method of claim 11 wherein the edge-router-refresh message further comprises:
a list of the plurality of AS traversed by the path before the modification.

14. The method of claim 13 wherein the step of detecting the modification further comprises obtaining the list.

15. The method of claim 11 wherein the step of detecting the modification is performed by receiving an indication of the modification in the RMM of the IER from a Routing Engine of the IER.

16. The method of claim 15 wherein the indication is issued from one of an Internal Routing Protocol (IRP) module and an External Routing Protocol (ERP), module of the Routing Engine of the IER.

17. The method of claim 16, wherein the indication is issued from one of the IRP module and the ERP module following a modification in at least one of a plurality of Routing Tables of the Routing Engine of the IER.

18. A method in an edge router for updating state information related to a data session in a network, the network comprising a plurality of Autonomous Systems (AS) wherein the edge router is on the edge of one of the plurality of AS, the data session being established on a path from a source connected to a first edge router acting as an ingress edge router (IER) of a first one of the plurality of AS, towards a destination connected from the source via a second one of the plurality of AS, the path having appropriate resources reserved in the plurality of AS, wherein a modification to the data session changes at least a portion of the path into a modified path, the method comprising the steps of:
receiving an edge-router-refresh message in the edge router, the edge-router-refresh message comprising:
an identifier of the data session;
an identifier of an Originating Edge Router, which issued the edge-router-refresh message; and
an indication that the edge-router-refresh message is meant to be used by the edge routers and not by stateless routers present on the modified path;
determining in the edge router if an appropriate state exists for the modified path and, if not, creating the appropriate state.

19. The method of claim 18 further comprising steps of:
determining in the edge router if it is appropriate to reserve resource in the one of the plurality of AS; and
if it is appropriate, initiating reservation in the one of the plurality of AS.

20. The method of claim 18 further comprising a step of:
forwarding the edge-router-refresh message from the edge router towards the destination on the modified path.

21. The method of claim 18 further comprising a step of:
determining in the edge router if it is appropriate to reserve resource in the one of the plurality of AS;
if it is appropriate, initiating reservation in the one of the plurality of AS; and
if it is not appropriate, forwarding the edge-router-refresh message from the edge router towards the destination on the modified path.

22. The method of claim 21:
wherein the edge-router-refresh message further comprises a list of the plurality of AS traversed by the path before the modification; and
wherein the step of determining is performed by determining that it is appropriate to reserve resource in the one of the plurality of AS if the one of the plurality of AS is not on the list.

23. An edge router in a network comprising a plurality of Autonomous Systems (AS), wherein the edge router is on the edge of one of the plurality of AS, a data session being established on a path from a source connected to a first edge router acting as an ingress edge router (IER) of a first one of the plurality of AS, towards a destination connected from the source via a second one of the plurality of AS, the path having appropriate resources reserved in the plurality of AS, wherein a modification to the data session changes at least a portion of the path into a modified path, the edge router comprising:

a Routing Engine (RE) comprising:
        at least one routing table; and
        at least one Routing Protocol module using the at least one routing table; and
    a Resource Management Module (RMM), that:
        receives an edge-router-refresh message comprising:
            an identifier of the data session;
            an identifier of an Originating Edge Router, which issued the edge-router-refresh message; and
            an indication that the edge-router-refresh message is meant to be used by the edge routers and not by stateless routers present on the modified path;
        determines if appropriate state exists for the modified path and, if not, creates the appropriate state.

24. The edge router of claim 23 further comprising a network interface module for managing a plurality of network interfaces (NI) and wherein the at least one Routing Protocol Module comprises:
    an Internal Routing Protocol module that participates to routing of data packets within the AS using at least one of the plurality of NI and the at least one routing table; and
    an External Routing Protocol module that participates to routing of data packets exchanged with a further AS using a second one of the plurality of NI and the at least one routing table.

25. The edge router of claim 23 wherein the RMM:
determines if it is appropriate to reserve resource in the one of the plurality of AS; and
if it is appropriate, initiates reservation in the one of the plurality of AS.

26. The edge router of claim 23 wherein the RMM:
forwards the edge-router-refresh message towards the destination on the modified path.

27. The edge router of claim 23 wherein the RMM:
determines if it is appropriate to reserve resource in the one of the plurality of AS,
if it is appropriate, initiates reservation in the one of the plurality of AS; and
if it is not appropriate, forwards the edge-router-refresh message towards the destination on the modified path.

28. The edge router of claim 23:
wherein the edge-router-refresh message further comprises a list of the plurality of AS traversed by the path before the modification; and
wherein the RMM determines that it is appropriate to reserve resource in the one of the plurality of AS if the one of the plurality of AS is not on the-list.

29. The edge router of claim 23 wherein the identifier of the edge router is one of a routable identifier of the edge router or a non-routable identifier of the edge router.

30. The edge router of claim 23 wherein the identifier is a non-routable identifier of the edge router comprising authentication information.

31. An edge-router-refresh network signaling message created by an edge router located in a network comprising a plurality of Autonomous Systems (AS), a data session being established on a path from a source connected via a first one of the plurality of AS, towards a destination connected from the source via a second one of the plurality of AS, the edge-router-refresh network signaling message comprising:
    an identifier of the data session;
    an identifier of the edge router, which issued the edge-router-refresh network signaling message; and
    an indication that the edge-router-refresh network signaling message is meant to be used by the edge routers and not by stateless routers present on the modified path.

32. The edge-router-refresh network signalling message further comprising a list of the plurality of AS traversed by the path before the modification.

\* \* \* \* \*